F. CARTLIDGE.
TRANSMISSION MECHANISM.
APPLICATION FILED APR. 18, 1918.
1,418,126. Patented May 30, 1922.
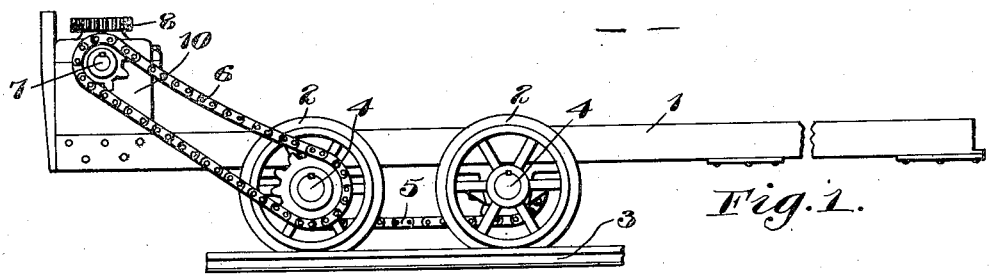
Fig. 1.
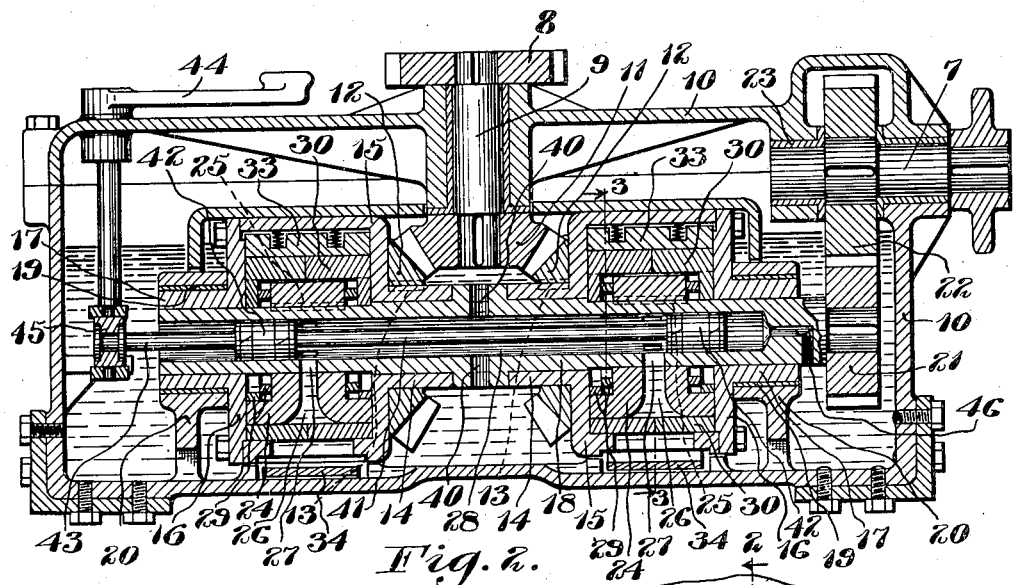
Fig. 2.
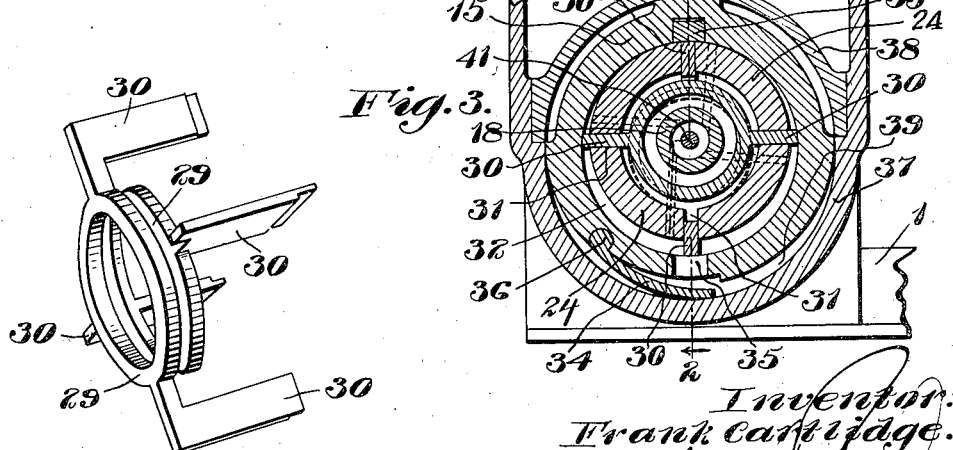
Fig. 3.
Fig. 4.
Inventor:
Frank Cartlidge.
by Horace L. Pehle
att'y.

UNITED STATES PATENT OFFICE.

FRANK CARTLIDGE, OF CLAREMONT, NEW HAMPSHIRE, ASSIGNOR TO SULLIVAN MACHINERY COMPANY, A CORPORATION OF MASSACHUSETTS.

TRANSMISSION MECHANISM.

1,418,126. Specification of Letters Patent. Patented May 30, 1922.

Application filed April 18, 1918. Serial No. 229,389.

*To all whom it may concern:*

Be it known that I, FRANK CARTLIDGE, a citizen of the United States, residing at Claremont, in the county of Sullivan and State of New Hampshire, have invented certain new and useful Improvements in Transmission Mechanism, of which the following is a full, clear, and exact specification.

My invention relates to transmission mechanism.

It has for its object to provide an improved transmission mechanism whereby, through the use of a fluid as an element in the transmission, improved results are obtained. A further object of my invention is to provide an improved transmission mechanism of the reversible, variable speed type and one especially adapted to use in connection with power driven trucks, such as mining machine trucks, the same comprising an improved construction whereby it is possible to obtain the desired flexibility of control of truck movement and at the same time reduce the cost of maintenance. These and other objects and advantages of my improved construction will, however, hereinafter more fully appear.

In the accompanying drawings, I have shown for purposes of illustration one embodiment which my invention may assume in practice.

In these drawings,—

Fig. 1 is a side elevation of a mining machine truck equipped with my improvement.

Fig. 2 is a vertical sectional view taken on line 2—2 of Fig. 3.

Fig. 3 is a transverse sectional view taken on line 3—3 of Fig. 2.

Fig. 4 is a detail perspective view of one set of the blade members.

In this illustrative construction, I have shown a mining machine truck frame 1 of the usual form mounted on truck wheels 2 adapted to move over the mine track 3, the axles 4 of the wheels being connected together through a usual chain and sprocket connection 5 and connected through another chain and sprocket connection 6 to a transversely disposed shaft 7 journaled on the rear end of the truck and operatively connectable, through improved mechanism hereinafter described, to a gear 8 carried on the truck and adapted to be engaged and driven by a gear on the mining machine during transport of the latter, all in a well known manner.

It will be observed that the gear 8 is herein carried on an upright shaft 9 journaled in a suitable enclosed, preferably oil-tight casing 10. Upon the lower end of this shaft 9 is carried a bevel gear 11 adapted to mesh constantly in a well known manner with spaced, cooperating bevel gears 12. These gears 12 are herein shown to be keyed at 13 to the oppositely disposed hubs 14 of oppositely and coaxially disposed rotatable casing members 15. In my improved construction, these casing members 15 are also provided on their opposite ends with removable end plates 16 which are, in turn, provided with hub portions 17 cooperating with the hubs 14 to form bearings for a shaft 18. As shown, these portions 17 are themselves also suitably journaled in bearing sleeves 19 carried by bearing members 20 projecting upward from the bottom of the casing 10. It will also be noted that the shaft 18, which is journaled in the hubs 14 and 17, carries a pinion 21 on one of its ends, which pinion in turn constantly meshes with a gear 22 fixed to the shaft 7, preferably at a point between suitable shaft bearings 23 formed in the casing 10. As a result of the construction described above, it will be observed that by connecting one or the other of the rotating members 15 to the shaft 18, the latter and the shaft 7 may be rotated in either direction as desired.

My improved mechanism for connecting these elements is herein shown to comprise means whereby any suitable fluid, as for instance oil carried in the casing 10, may be used as a part of the transmission, the same herein acting as a connecting element between the members 15 and the shaft 18. More particularly, it will be noted that in my improved construction each of the casing members 15 houses a member 24 keyed to the shaft 18 at 25 and having a series of radially disposed ports 26 extending to its periphery and registering at their inner ends with cooperating ports 27 formed in the shaft 18 and, in turn, communicating with a longitudinally disposed bore 28 formed in that shaft. As illustrated, each of these members 24 carries within its opposite ends a plurality of ring-like members 29, herein having a plurality of oppositely disposed blades 30 formed integral therewith and extending through suitable cooperating slots 31 formed in the member 24, the different members 29 of each set preferably, as shown in Fig. 3, having their blades disposed in planes extending at right angles to one another. Attention is also directed to the fact that each member 15 is herein provided with an eccentric bore 32 with the wall of which the members 30 are adapted to engage, as shown in Fig. 3, the same, as the members 15 are rotated, successively occupying the different relative positions shown in that figure, and preferably also successively cooperating with a spring pressed packing member 33 preferably disposed longitudinally of the member 15, as shown in Figs. 2 and 3. Controlling the supply of fluid to the bore 32, is also a valve 34 which controls the supply of fluid passing from the casing 10 through a radially extending port 35 formed in the member 15, the valve 34 being shown herein as a hinged valve pivoted at 36 to the member 15 and rotatable with that member. As shown herein, each member 15 and its valve 34 is rotatable within outer casing members 37 and 38, the lower of which preferably forms a part of the casing 10 and is provided, as shown, with an eccentric bore 39 the wall of which acts successively to close the valve 34 and to permit the same to open as the valve is carried around with its rotating member 15. It will also be observed that I have herein provided suitable ports 40 in the shaft 18 which open from the bore 28 of the latter into the casing 10, so that the fluid may flow in circuit from the casing 10, through the ports 26, 27, through the bore 28 of the shaft 18, and through the lateral ports 40 back into the casing. By the use of this construction, it will be observed that by controlling the flow through the several sets of ports 27, the fluid in the casing 10 is enabled to serve as a connecting element between either of the members 15 and the shaft 18, in such a manner that the latter may remain idle or be rotated at will in either direction at any desired speed depending upon the amount of fluid flowing.

Controlling the flow of fluid, and thereby controlling the connection of the parts and the direction and speed of rotation of the shafts 18 and 7, is improved controlling mechanism. This controlling mechanism is herein shown in the form of a valve rod 41 reciprocable in the bore 28 in the shaft 18 and having valve members 42 on its opposite ends which are adapted alternately to cover the ports 27 and thereby to regulate or entirely shut off the supply of fluid passing through these ports. As illustrated, this rod 41 is provided with an extension 43 on one of its ends suitably connected to an external operating or controlling member, as, for instance, a crank connection 44, by means of any suitable shipper connection 45 adapted to convert a rotary movement of the member 44 into a longitudinal movement of the member 41. Attention is also directed to the fact that, as shown herein, the bore 28 is provided with a passage 46 leading from the right hand end of the same into the interior of the casing 10, thereby eliminating any retarding action of the valve which might otherwise arise from the trapping of fluid between the valve and the end of the bore.

In considering the operation of my improved transmission mechanism, it will be understood that when the mining machine is in position on the truck and its motor is running, the rotation of the gear 8 is constantly imparted through the shaft 9 and the bevel gear 11 to the two cooperating bevel gears 12 in such a manner as to rotate the two members 15 in opposite directions. When the valves 42 are in the position shown in Fig. 2, these members 15 rotate freely upon the shaft 18, the fluid then simply flowing in circuit from the casing 10 through each valve 34, the ports 26 and 27, the bore 28 in the shaft 18, and the ports 40 communicating with that bore, back into the casing without causing any rotation of the shaft 18 or the shaft 7 geared thereto. When, however, the controlling member 44 is so adjusted that the valves 42 are moved to the right or left, it will be noted that the amount of fluid which is enabled to pass through one of the sets of ports 27 is limited, so that, as the member 15 cooperating therewith is rotated, a certain amount of fluid is intermittently pumped into the eccentric portion 32 by the valve 34 carried by that member 15, the valve opening and closing as it is rotated. Consequently, as the member 15 continues to rotate, it will be observed that the fluid acts as a connecting element between one of the members 15 and the blades 30 upon one of the members 24, in such a manner as to rotate the shaft 18 and its connected shaft 7, and thereby drive the truck. It will also be observed that by simply moving the valve 42 in such a manner as to permit more or less fluid to flow, it is possible to vary the speed of rotation of the shafts 18 and 7, the speed being increased when less fluid flows and decreased when more fluid flows. Through the use of my improved valve mechanism, wherein the valve members 42 are alternately operative, it will also be noted that the members 15 are alternately connectable with the shaft 18 in such a manner as to drive the latter in either direction as desired. It will also be evident that suitable movement of the lever 44 to reverse the driving connections during movement of the truck in one direction, causes the latter to be braked in a well known manner.

As a result of my improved construction wherein the fluid acts as the connecting element between the desired driving and driven parts, it will be observed that an exceedingly simple, powerful, and long-lived drive is provided which is also controlled within wide limits with very little manual effort. Attention is also directed to the fact that due to the provision of the eccentric bore 39 in the casing member 37, while the valve 34 is closed during each revolution in such a manner as to project a given amount of fluid into the eccentric bore 32, the construction is such as at the same time to permit of sufficient leakage to by-pass any excess fluid. It will also be observed that due to the packing member 33 which co-acts with each blade 30 at the upper limit of the stroke thereof, the fluid is effectually prevented from flowing back between these elements during the rotation of the parts. These and other advantages of my improved construction will, however, be clearly apparent to those skilled in the art.

While I have in this application specifically described one embodiment which my invention may assume in practice, it will be understood that this form of the same is used for purposes of illustration, and that the invention may be modified and embodied in various other forms without departing from its spirit or the scope of the appended claims.

What I claim as new and desire to secure by Letters Patent is:

1. In a transmission mechanism, a rotatable driving member, a driven member disposed therein, a liquid-containing chamber enclosing said members, means formed on said driving member through which liquid may be admitted from said chamber to interlock said members, and means including an axial discharge passage arranged within both of said members and a valve controlling the same for controlling the driving of said second member by said first member.

2. In a transmission mechanism, a rotatable driving member, a driven member disposed therein, a liquid containing chamber surrounding said driving member, means including a port in the periphery of said driving member through which liquid may be admitted from said chamber to interlock said members, and means including a valve controlled passage leading through an end of said driven member for controlling the interlocking and releasing of said members.

3. In a transmission mechanism, a liquid containing chamber, a rotatable driving member therein having an eccentric bore, a driven member disposed therein, and means for supplying connecting fluid to cooperate with said members to said bore and for governing its escape therefrom including a plurality of passages through certain of which the flow is radial and others of which it is in the direction of the axis of rotation of said members.

4. In a transmission mechanism, a rotatable driving member having an eccentric bore, a driven member carrying a blade and disposed therein, means for permitting an escape of fluid through said blade carrying member at will, and means for automatically pumping fluid to said blade carrying member through said driving member.

5. In a transmission mechanism, a rotatable driving member having an eccentric bore, a driven member disposed therein and cooperating with the bore of said driving member to form chambers of variable volume on relative rotation of said driving and driven members, means for intermittently pumping fluid to cooperate with said members into the chambers formed in said bore, and means for regulating its passage therefrom, the points of admission and discharge of fluid to and from said bore being differently spaced radially with respect to the axis of rotation of said members.

6. In a transmission mechanism, a rotatable driving member having an eccentric bore, a driven member disposed therein, and means including a valve member moved to open and closed position by rotation of said rotatable member for intermittently supplying fluid to said eccentric bore.

7. In a transmission mechanism, a rotatable ported driving member, a driven member disposed therein, a relatively stationary liquid containing casing, means for supplying liquid from said casing through a port in said driving member to connect said members, and means for discharging said liquid through said driven member to disconnect said members.

8. In a transmission mechanism, a rotatable driving member, a driven member disposed therein, a stationary fluid containing casing surrounding said driving member, a pumping element carried by said driving member and cooperating with said casing, rotation of said driving member relative to said driven member causing a flow of fluid from said casing through said members back to said casing, and means for interrupting said flow to lock said elements for simultaneous rotation.

9. In a transmission mechanism, a rotatable driving member, a driven member disposed therein, a liquid containing casing relative to which said members are both rotatable, conduit means connecting said driven member and casing, means independent of said conduit and including a valve controlled by rotation of said driving member for supplying liquid from said casing to connect said members, and means for controlling the flow of fluid through said conduit, said mechanism being operative on closure of said conduit to connect said driving and driven members.

10. In a transmission mechanism, a rotatable driving member having an eccentric bore, a driven member disposed in said bore, a fluid pumping valve mechanism rotatable with said rotating member, and means for actuating said valve mechanism.

11. In a transmission mechanism, a casing having an eccentric bore, a rotating driving member rotatable therein and having an eccentric bore, a driven member disposed in said last mentioned bore, and means for supplying fluid from one bore to the other controlled by said first mentioned eccentric bore.

12. In a transmission mechanism, a casing having an eccentric bore, a rotating driving member rotatable therein and having an eccentric bore, a driven member disposed in said last mentioned bore, and means including a valve on said rotatable member for supplying fluid from one bore to the other.

13. In a transmission mechanism, a casing having an eccentric bore, a rotating driving member rotatable therein and having an eccentric bore, a driven member disposed in said last mentioned bore, and means including a valve controlled by the walls of said first mentioned bore for supplying fluid therefrom to said second mentioned bore.

14. In a transmission mechanism, a rotatable driving member having an eccentric bore, a driven member disposed in said bore and having ports communicating therewith, means for automatically supplying fluid to said bore during relative movement of said members and tending to pump fluid thereto as long as said first mentioned member rotates, and means for controlling the flow of fluid through said ports.

15. In a transmission mechanism, a rotatable driving member having an eccentric bore, a driven member disposed in said bore and having ports communicating therewith, a casing surrounding both of said members and containing a liquid, pumping means carried by said driving member and cooperating with said casing, relative movements between said driving and driven members and between the driving member and said casing controlling delivery of fluid to said bore, and means for controlling the flow of fluid through said ports.

16. In a transmission mechanism, a rotatable driving member having an eccentric bore, a driven member disposed in said bore and having ports communicating therewith, means for automatically supplying fluid to said bore during relative movement of said members and tending to pump fluid thereto as long as said first mentioned member rotates, and means for decreasing the flow of fluid through said ports.

17. In a transmission mechanism, a liquid containing chamber, a rotatable driving member arranged therein and having an eccentric bore and port means communicable with said chamber, a hollow driven member disposed in said bore and having ports communicating therewith, passage means connecting the interior of said hollow driven member also with said chamber, and means including an axially disposed valve for controlling the flow of fluid through said ports and passage means.

18. In a transmission mechanism, a rotatable driving member having an eccentric bore, a driven member disposed in said bore and having ports communicating therewith, means for automatically supplying fluid to said bore during relative movement of said members and tending to pump fluid thereto as long as said first mentioned member rotates, and means including an axially disposed reciprocable valve for controlling the flow of fluid therough said ports.

19. In a transmission mechanism, a rotatable driving member having an eccentric bore, a blade carrying driven member disposed in said bore and having ports communicating therewith, a valve on said rotatable member controlling the supply of fluid to said bore, and a packing member intermittently engageable with the blades of said blade carrying member.

20. In a transmission mechanism, a fluid filled casing having an eccentric bore, a rotatable driving member therein likewise having an eccentric bore, a driven member in said last mentioned eccentric bore, means for supplying fluid from said first mentioned bore to said second mentioned bore, and means for releasing a variable quantity of fluid from said second mentioned bore.

21. In a transmission mechanism, a hollow driven shaft, a plurality of driven members connected thereto, a plurality of driving members adapted to cooperate with said plurality of driven members to drive said shaft, a fluid in said hollow shaft for causing pairs of said driving and driven members to co-act to drive said shaft, means for circulating said fluid to cause the discharge of the same through said hollow shaft, and means for controlling a flow of said fluid.

22. In a transmission mechanism, a hollow driven shaft, a plurality of driven members connected thereto, a plurality of driving members adapted to cooperate with said plurality of driven members to drive said shaft, a fluid in said hollow shaft for causing pairs of said driving and driven members to co-act to drive said shaft, means for circulating said fluid to cause the discharge of the same through said hollow shaft, and means in said hollow shaft for controlling a flow of said fluid.

23. In a reversible transmission mechanism, a hollow driven shaft, a plurality of driven members connected thereto, a plurality of driving members adapted to cooperate with said plurality of driven members to drive said shaft, a fluid in said hollow shaft for causing pairs of said driving and driven members to co-act to drive said shaft, and means comprising a plurality of pistons in said shaft for controlling a flow of said fluid.

24. In a reversible transmission mechanism, a hollow driven shaft, a plurality of driven members connected thereto, a plurality of driving members adapted to cooperate with said plurality of driven members to drive said shaft, a fluid in said hollow shaft for causing pairs of said driving and driven members to coact to drive said shaft, and means comprising a plurality of pistons reciprocable in unison in said shaft for controlling a flow of said fluid.

25. In a transmission mechanism, a plurality of rotatable members having eccentric bores, a shaft extending axially therethrough, a plurality of driven members fixed to said shaft, one within each of said bores, and means adjustable at will to supply connecting fluid alternately to said bores.

26. In a transmission mechanism, a plurality of ported rotatable driving members, a shaft disposed axially therethrough, ported driven members fixed to said shaft and disposed within each of said rotatable members, fluid supply means normally maintaining a fluid flow through said driving and driven members, and means for controlling the flow of fluid through either set of the same.

27. In a transmission mechanism, a plurality of ported rotatable driving members, a shaft disposed axially therethrough, ported driven members fixed to said shaft and disposed within said rotatable members, means normally maintaining a constant flow of fluid through said driving and driven members, and fluid controlling means for alternately connecting one of said rotatable members with its driven member.

28. In a transmission mechanism, a plurality of ported rotatable driving members, a shaft extending axially therethrough, a plurality of ported blade carrying driven members fixed to said shaft and disposed one within each of said rotatable members, means for normally maintaining a flow of fluid through said blade carrying and rotatable members, and means for decreasing the flow through one set of the same and thereby connecting said members.

29. In a transmission mechanism, a plurality of ported rotatable driving members, a hollow shaft extending axially therethrough, a plurality of ported blade carrying driven members fixed to said shaft and disposed one within each of said rotatable members, means for normally maintaining a flow of fluid through said blade carrying and rotatable members, and means including a valve in said hollow shaft for decreasing the flow through one set of said members and thereby connecting said members.

30. In a transmission mechanism, a plurality of ported rotatable driving members, a hollow shaft extending axially therethrough, a plurality of ported blade carrying driven members fixed to said shaft and disposed one within each of said rotatable members, means for normally maintaining a flow of fluid through said blade carrying and rotatable members, and means including a valve in said hollow shaft for alternately limiting the flow through said sets of blade carrying and rotatable members and thereby alternately connecting the members comprising each set.

31. In a transmission mechanism, a hollow driven shaft, a plurality of driven members connected thereto, a plurality of driving members adapted to cooperate with said plurality of driven members to drive said shaft, and means including a plurality of longitudinally movable pistons disposed in said shaft for controlling the cooperation of said members.

32. In a transmission mechanism, a hollow driven shaft, a plurality of driven members connected thereto, a plurality of driving members adapted to cooperate with said plurality of driven members to drive said shaft, and means in said shaft for controlling the cooperation of said members, said means including a fluid and means for controlling the movement of said fluid in said shaft.

33. In a transmission mechanism, a hollow shaft, a plurality of clutch elements connected thereto, a plurality of oppositely rotatable clutch elements adapted to cooperate with said first mentioned clutch elements, and means for controlling the cooperation of said clutch elements including a fluid in said shaft, and means in said shaft for controlling said fluid.

In testimony whereof I affix my signature.

FRANK CARTLIDGE.